March 18, 1952  C. W. GINTER  2,589,544
HOSE GUIDE
Filed March 31, 1947  3 Sheets-Sheet 1
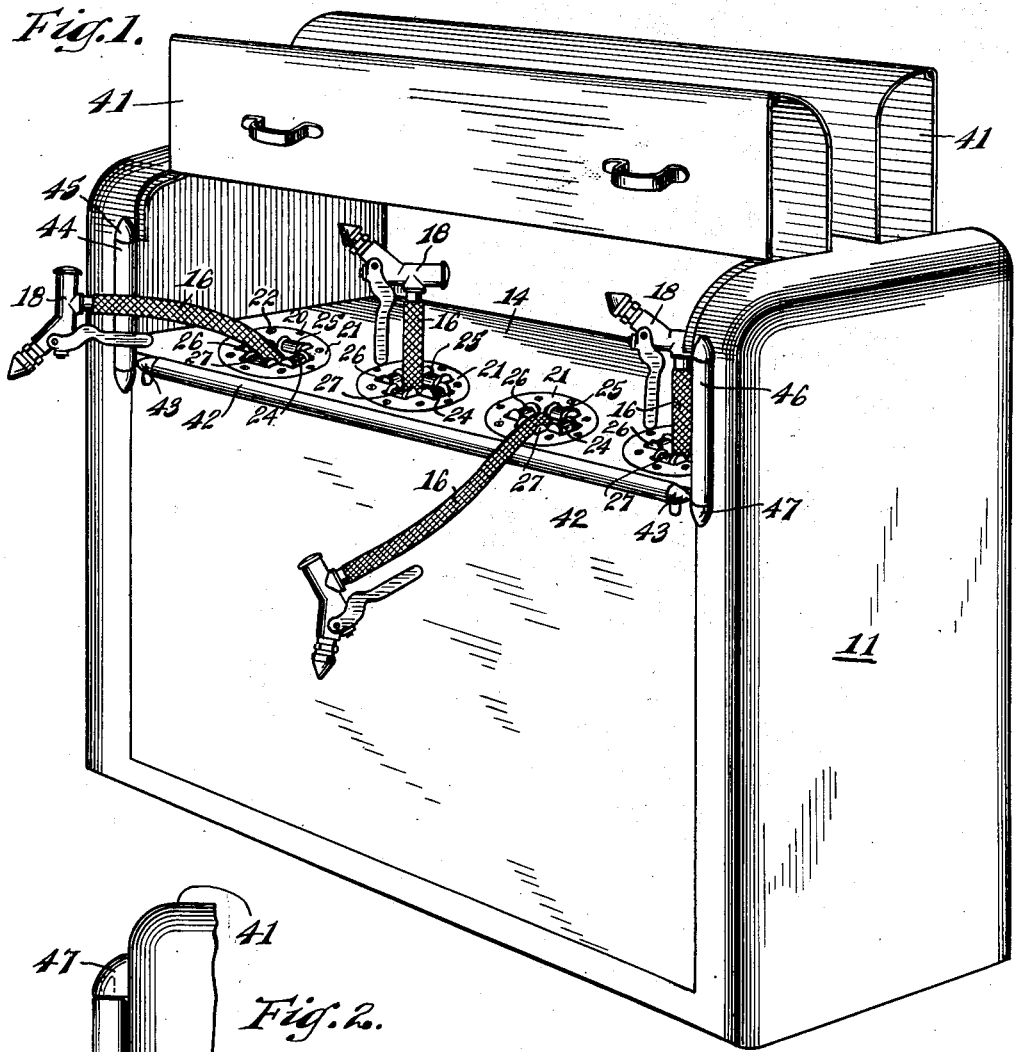
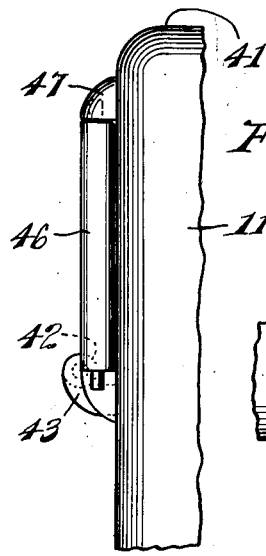
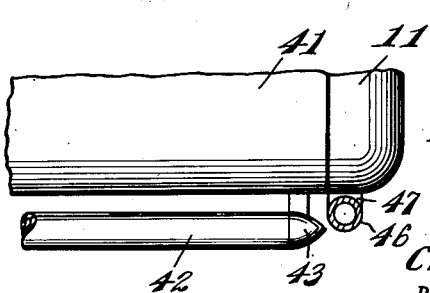
INVENTOR.
Charles W. Ginter.
BY Bair & Freeman
Attys.

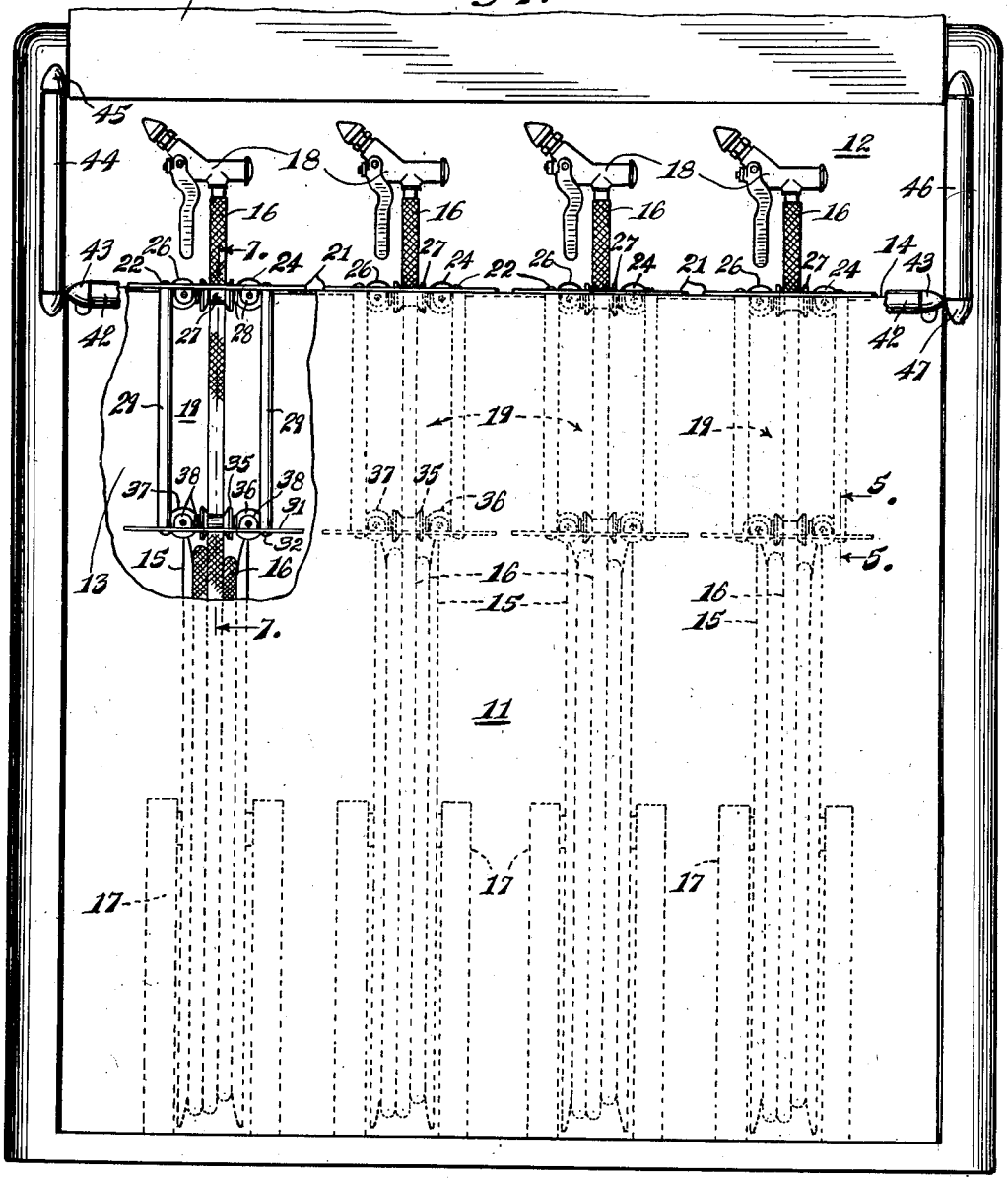

March 18, 1952 C. W. GINTER 2,589,544
HOSE GUIDE
Filed March 31, 1947 3 Sheets-Sheet 3
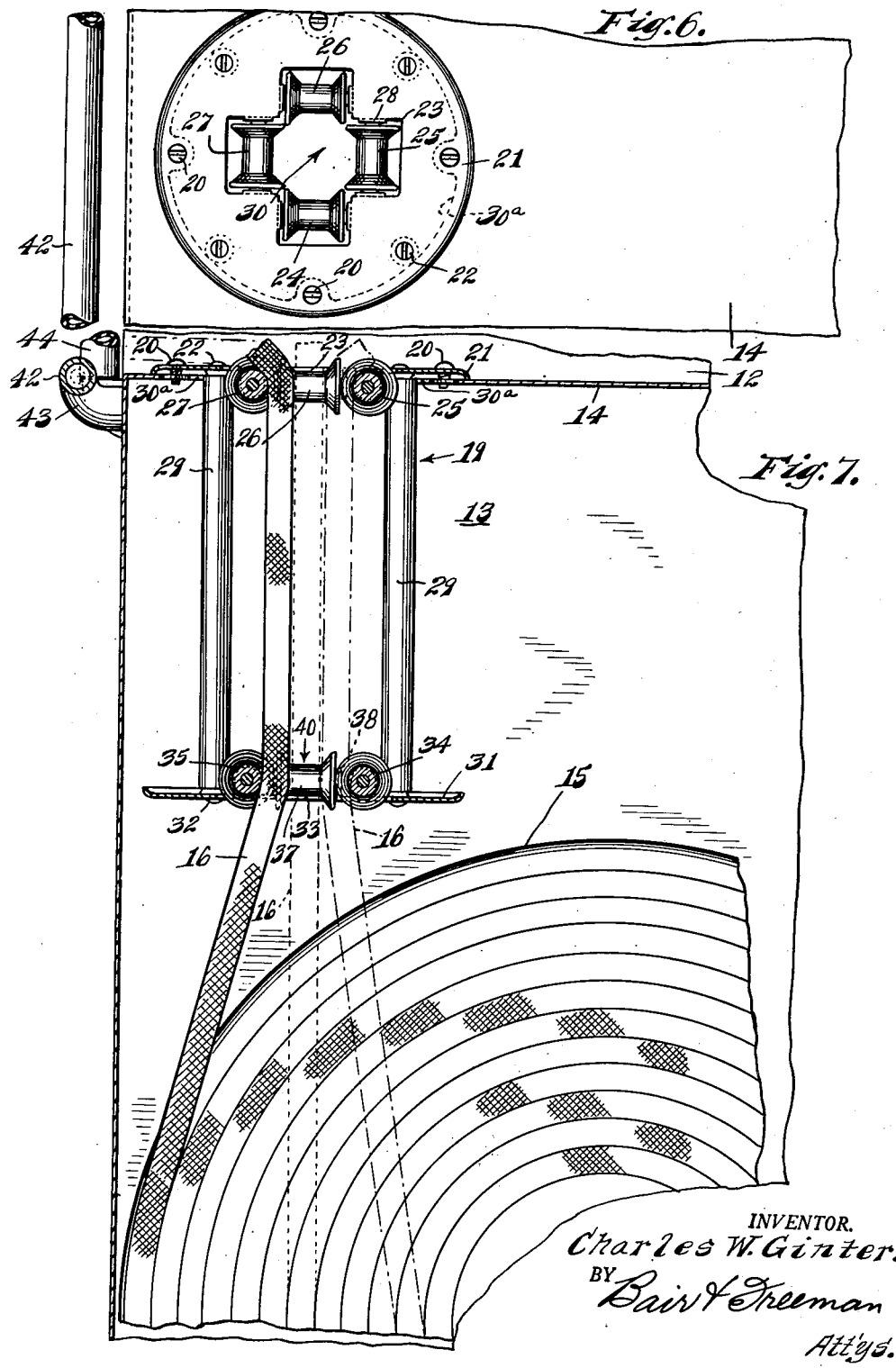
INVENTOR.
Charles W. Ginter.
BY Bair & Freeman
Att'ys.

Patented Mar. 18, 1952

2,589,544

UNITED STATES PATENT OFFICE 2,589,544

HOSE GUIDE

Charles W. Ginter, Bryan, Ohio, assignor to The Aro Equipment Corporation, Bryan, Ohio, a corporation of Ohio Application March 31, 1947, Serial No. 738,481

2 Claims. (Cl. 242—157)

1

This invention relates to lubrication cabinets and particularly to means for guiding and affording movement of the flexible lubricant carrying hose generally associated with such a cabinet.

Heretofore, hose guides have been utilized wherein the hose passes through a single roller assembly consisting of four horizontally disposed rollers located at diametrically opposed sides of an opening through which the hose extends. It has been found that such a hose guide materially reduces friction, but that the amount of force required to withdraw the hose therefrom is still excessive, because the hose tends to curve as it is being pulled out. The curvature which the hose assumes creates excessive friction in the roller assembly as well as in the reel assembly on which the hose is wound.

It is an object of the invention to provide an improved hose guide which materially lessens the amount of force required to remove the hose from the hose reel and to replace the hose on the reel.

It is another object of the invention to provide an improved hose guide which substantially prevents bending or kinking of the hose between a position adjacent the reel and the position wherein the hose leaves the guide.

It is also an object of the invention to provide an improved hose guide adjacent the reel and to provide improved means for affording movement of the hose adjacent the outer surfaces of the cabinet which encloses the hose and the reel when not in use.

It is another object of the invention to provide a hose guide having one portion thereof disposed adjacent the reel and another portion thereof spaced a greater distance from the reel, which portions have aligned openings therein through which the hose passes.

It is also an object of the invention to provide a hose guide having spaced guiding portions and aligned openings through which the hose passes, which openings are defined by spaced rollers.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a perspective view of a lubrication cabinet including the improved hose guides and rollers with one of the hoods or covers shown in the open position;

Figure 2 is a partial side elevational view of the cabinet shown in Figure 1;

2

Figure 3 is a partial top plan view of the cabinet shown in Figure 1;

Figure 4 is a front elevational view of the lubrication cabinet with parts thereof broken away for the sake of clarity;

Figure 5 is a partial sectional view of a lower portion of the hose guide taken on line 5—5 of Figure 4;

Figure 6 is a top plan view of the hose guide looking down on the supporting partition; and Figure 7 is a partial vertical sectional view of the hose guide and reel taken on line 7—7 of Figure 4.

Referring specifically to the drawings for a detailed description of the invention, numeral 11 designates generally a lubrication cabinet divided into a lower reel compartment 13 and an upper compartment 12 by a horizontal partition 14. Reels 15 for hose 16 are disposed in the compartment 13 and are supported by arms 17 extending upwardly from the bottom of the compartment 13. The hose 16 may convey lubricant, oil, gas or water, etc.

As is well known in the art, the reels 15 are provided with a spring motor and suitable ratchet mechanism, neither of which are shown since these parts are standard. The spring motor tends to reel in the hose 16 and the ratchet mechanism retains the hose in the position desired when the hose is withdrawn from the cabinet in order to effect lubrication of an automobile.

The hose 16 is provided with service fittings shown at 18 and these fittings are normally contained within the compartment 12 when not in use. A hose guide 19, is provided for each reel 15 and hose 16. The hose guide 19 comprises an upper circular plate 21 secured to the top of the partition 14 by screws 20. A cross-shaped aperture 23 is provided in the center of the plate 21 and four rollers 24, 25, 26 and 27 are rotatably mounted in the cross at 90° to each other, with the front and back rollers parallel to the front of the cabinet, leaving a central aperture 30, through which the hose 16 extends. Tabs 28 are bent from the plate 21 to provide journals for the rollers 24, 25, 26 and 27.

Four supporting rods 29 extend downwardly from the plate 21 through an opening 30a in the partition 14 and support a lower circular plate 31, which is identical in construction to the upper plate 21 except that it is inverted. The plate 21 is secured to the rods 29 by screws 22 and plate 31 is secured to the rods 29 by screws 32. A cross-shaped opening 33, similar to the opening 23, in plate 21 is provided in the plate 31 and is in vertical alignment with the opening 23. Rollers 34, 35, 36 and 37 are disposed in the cross-shaped opening at 90° to each other and tabs 38, which are bent from the plate 31, provide journals for the rollers 34, 35, 36 and 37. The rollers define an opening 40, through which the hose 16 extends, which opening is also in alignment with the opening 30 in the plate 21.

It will be noted that the lower plate 31 and the rollers 34, 35, 36 and 37 are disposed relatively close to the reel 15. The hose 16, as it leaves the reel 15, enters the opening 40 in the lower plate 31 at different angles, depending upon the amount of hose which is on the reel 15. Likewise, the hose extending through the opening 30 of the upper plate 21, extends therethrough at various angles, depending upon the position in which the operator is standing when withdrawing the hose 16. It is, therefore, apparent that all of the rollers disposed in both the upper plate 21 and the lower plate 31 come into play at various times during the operation of the device. However, the portion of the hose 16 which is disposed between the upper rollers and the lower rollers is always substantially in a straight line, although very slight bending of the hose is permitted. Because of the fact that the hose extends in a substantially straight line from a point adjacent the reel 15 to a point above the partition 14, insures that a minimum amount of force will be required to withdraw the hose 16 from the reel 15. It is, therefore, possible to considerably reduce the power of the spring motor for the reel 15, which also, in turn, provides for easier withdrawal of the hose 16. Furthermore, the reeling in operation requires much less force.

As shown in Figures 1 and 4, hoods or covers 41 are provided in the upper portion of the cabinet and may be raised to the position shown in Figure 1 in order to expose the upper compartment 12 and the hoses 16 and fittings 18. In order to further reduce the amount of force required to reel the hose 16 in and out, a horizontal roller 42 is disposed on the front of the cabinet so that the upper portion thereof will be slightly above the plane of the partition 14. The longitudinal roller 42 is journalled in bearing members 43 secured to the front of the cabinet.

Vertically disposed rollers 44 and 46 are disposed at the sides of the cabinet adjacent the compartment 12 and also extend inward of the side walls of the cabinet a short distance. The vertical rollers 44 and 46 are journalled in bearing members 45 and 47, respectively, secured to the front wall of the cabinet.

Preferably similar rollers are placed on both sides of the cabinet and serve the additional function of protecting the cabinet from bumps by the doors and the like of automobiles being serviced.

As will be apparent from Figure 1, if the hose 16 is withdrawn straight outwardly or downwardly from the hose guides 19, the horizontal roller 42 comes into operation and permits the hose to be withdrawn without passing over a sharp corner of the cabinet. Likewise, if the hose 16 is withdrawn sideways of the cabinet, the vertical rollers 44 or 46 come into operation and prevent the hose from passing over any sharp corners of the cabinet. It will be noted that the horizontal roller 42 extends closely adjacent to the vertical rollers 44 and 46, so that if the hose is withdrawn from either of the lower corners of the compartment 12, both the roller 42 and either roller 44 or 46 will come into operation. It is obvious that the provision of the rollers 42, 44 and 46 materially reduce the friction of reeling the hose 16 in or out if the hose is withdrawn in such a position as to contact parts of the cabinet itself. This also makes it possible to reduce the power of the spring motor for the reel 15.

From the foregoing, it will be apparent that I have provided a novel hose guide and novel external friction reducing means for the hose on a service cabinet, which materially reduces the amount of force required for reeling and unreeling operations.

Some changes may be made in the construction and arrangement of the parts of my hose guide without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A lubrication cabinet for use with a flexible hose wound on a reel and having one end free, said lubrication cabinet having a panel dividing the cabinet into two compartments, said reel being positioned in the first compartment and the free end of the hose extending through said panel into the second compartment, means mounted on said panel for guiding the hose onto and off of the reel, said latter means comprising a guide member substantially in the plane of said panel and spaced a considerable distance from the reel and having an opening therein through which the hose is adapted to pass, a second guide member secured to said panel and disposed closely adjacent to said reel, said second guide member also having an opening therein through which the hose is adapted to pass, said openings being in substantial vertical alignment, said second compartment having an opening therein extending the greater portion of the width of said cabinet and through which the free end of the hose is adapted to be withdrawn, and friction reducing means disposed on the cabinet adjacent at least some of the edges of said opening, said hose being withdrawn over said friction reducing means in some positions of said hose.

2. A lubrication cabinet for use with a flexible hose wound on a reel and having one end free, said lubrication cabinet having a panel dividing the cabinet into two compartments, said reel being positioned in the first compartment and the free end of the hose extending through said panel into the second compartment, means mounted on said panel for guiding the hose onto and off of the reel, said latter means comprising a guide member substantially in the plane of said panel and spaced a considerable distance from the reel and having an opening therein through which the hose is adapted to pass, a second guide member secured to said panel and disposed closely adjacent to said reel, said second guide member also having an opening therein through which the hose is adapted to pass, said openings being in substantial vertical alignment, said second compartment having a plurality of rectangular openings therein, the edges of said openings being disposed substantially horizontally and vertically, said openings extending the greater portion of the width of said cabinet and through which the free end of the hose is adapted to be withdrawn, and friction reducing means disposed on the cabinet adjacent at least some of the edges of said openings, said hose being withdrawn over said friction reducing means in some positions of said hose, said friction reducing means comprising a horizontal roller disposed adjacent a horizontal edge of each opening, and vertical rollers disposed adjacent the vertical edges of each opening.

CHARLES W. GINTER.

REFERENCES CITED

The following references are of record in the file of this patent:

UNITED STATES PATENTS

| Number | Name | Date |
|---|---|---|
| 235,359 | Hewitt et al. | Dec. 14, 1880 |
| 458,855 | Meinzer | Sept. 1, 1891 |
| 1,821,724 | Rinehart | Sept. 1, 1931 |
| 2,071,174 | Parker | Feb. 16, 1937 |
| 2,225,271 | Hope | Dec. 17, 1940 |
| 2,312,528 | Davis | Mar. 2, 1943 |
| 2,339,308 | Waugh | Jan. 18, 1944 |